US009606582B2

(12) United States Patent  
Kuo et al.

(10) Patent No.: US 9,606,582 B2  
(45) Date of Patent: Mar. 28, 2017

(54) TOUCH PANEL AND MANUFACTURING METHOD THEREOF

(71) Applicant: Acer Incorporated, New Taipei (TW)

(72) Inventors: Jin-Ting Kuo, New Taipei (TW); Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 16 days.

(21) Appl. No.: 14/445,074

(22) Filed: Jul. 29, 2014

(65) Prior Publication Data

US 2015/0084887 A1 Mar. 26, 2015

(30) Foreign Application Priority Data

Sep. 25, 2013 (TW) ............................... 102134568 A

(51) Int. Cl.
*G06F 3/045* (2006.01)
*G06F 3/041* (2006.01)
*G06F 1/16* (2006.01)

(52) U.S. Cl.
CPC .......... *G06F 1/1643* (2013.01); *G06F 1/1626* (2013.01); *G06F 3/0412* (2013.01); *G06F 3/0416* (2013.01); *G06F 2203/04103* (2013.01)

(58) Field of Classification Search
CPC .... G06F 1/1643; G06F 3/0412; G06F 1/1626; G06F 2203/04103; G06F 3/0416
See application file for complete search history.

(56) References Cited

U.S. PATENT DOCUMENTS

| 2006/0238517 | A1* | 10/2006 | King | G06F 1/1626 345/173 |
| 2012/0146921 | A1 | 6/2012 | Park | |
| 2013/0021268 | A1* | 1/2013 | Lee | G06F 3/0416 345/173 |
| 2014/0176453 | A1* | 6/2014 | Lee | G06F 3/041 345/173 |
| 2014/0239504 | A1* | 8/2014 | Yau | G02F 1/13439 257/773 |
| 2015/0153768 | A1* | 6/2015 | Shih | G06F 3/14 345/173 |

FOREIGN PATENT DOCUMENTS

| CN | 101950225 | 1/2011 |
| CN | 102193678 | 9/2011 |
| CN | 103237435 | 8/2013 |

(Continued)

*Primary Examiner* — Charles Hicks
(74) *Attorney, Agent, or Firm* — Jianq Chyun IP Office

(57) ABSTRACT

A touch panel configured to provide a touch signal is provided. The touch panel includes a substrate, a first vision opaque layer, an electrode layer, and a metal material layer. The substrate has a display area and a first recess portion. A part of or all of the first vision opaque layer is filled in the first recess portion. A part of the electrode layer is disposed on the display area and the other part of the electrode layer is disposed on the first vision opaque layer. When an object touches or approaches the touch panel, the electrode layer generates a touch signal correspondingly. The metal material layer is disposed on the first vision opaque layer and is connected with the electrode layer electrically to transmit the touch signal to a driving element. Besides, a manufacturing method of the touch panel is also provided.

20 Claims, 11 Drawing Sheets

(56) References Cited

FOREIGN PATENT DOCUMENTS

| | | |
|---|---|---|
| JP | 2013152525 | 8/2013 |
| TW | 201024851 | 7/2010 |
| TW | 201205149 | 2/2012 |
| TW | I373665 | 10/2012 |
| TW | 201248307 | 12/2012 |
| TW | M461835 | 9/2013 |

* cited by examiner

TOUCH PANEL AND MANUFACTURING METHOD THEREOF

CROSS-REFERENCE TO RELATED APPLICATION

This application claims the priority benefit of Taiwan application serial no. 102134568, filed on Sep. 25, 2013. The entirety of the above-mentioned patent application is hereby incorporated by reference herein and made a part of this specification.

BACKGROUND

Technical Field

The invention relates to a touch electronic apparatus. Particularly, the invention relates to a touch panel and a manufacturing method of the touch panel.

Related Art

In recent years, along with development of technology industry, electronic products such as notebooks (NBs), tablet PCs, and smart phones, etc. are frequently used in people's daily life. A part of the electronic apparatuses has features of lightness, slimness, shortness and smallness, and a user can hold the electronic apparatus by hand to perform operations and carry the same around. Types and functions of the electronic apparatuses are diversified, and the electronic apparatuses become more popular due to usage convenience and practicality thereof, which can be used for different purposes. Therefore, the user can hold such type of the electronic apparatus by a single hand, and operate the electronic apparatus by touching or pressing a keyboard or a touch panel on an operating interface of the electronic apparatus.

An electrode layer is formed in a display area of the touch panel of such type of the electronic apparatus for sensing a touch event. When an object touches or approaches the touch panel, the electrode layer correspondingly generates a touch signal. Generally, a vision opaque layer is formed at periphery (a non-display area) of the display area of the touch panel for shielding metal lines around the touch panel. The vision opaque layer in the non-display area is required to have an enough thickness to avoid exposing the metal lines at periphery of the display area to influence an appearance. The brighter the vision opaque layer is (for example, a gray color or a white color), the thicker the thickness thereof is. Moreover, in order to add a touch input function of an operating system, it is also required to fabricate the electrode layer at the non-display area, so that the non-display area can also provide the touch sensing signals. However, a surface of the vision opaque layer at the non-display area has a height difference with a surface of the display area. When the electrode layer is formed on the surface of the vision opaque layer and the surface of the display area, the height difference between the vision opaque layer and the display area is liable to lead to a line break phenomenon of the electrode layer.

SUMMARY

The invention is directed to a touch panel, which has a good production yield.

The invention is directed to a manufacturing method of a touch panel, by which a good production yield is achieved.

The invention provides a touch panel configured to provide a touch signal. The touch panel includes a substrate, a first vision opaque layer, an electrode layer, and a metal material layer. The substrate has a display area and a first recess portion outside the display area. The first vision opaque layer is formed on the substrate, where a part of or all of the first vision opaque layer is filled in the first recess portion. A part of the electrode layer is formed on the display area and the other part of the electrode layer is formed on the first vision opaque layer. When an object touches or approaches the touch panel, the electrode layer correspondingly generates the touch signal. The metal material layer is formed on the first vision opaque layer and is electrically connected to the electrode layer to transmit the touch signal to a driving element.

The invention provides a manufacturing method of a touch panel, which includes following steps. A substrate is provided, where the substrate has a first surface and a second surface opposite to each other. A first recess portion is formed on the first surface of the substrate, and a display area is defined on the first surface, where the first recess portion is located outside the display area. A first vision opaque layer is formed on the first surface, where a part of or all of the first vision opaque layer is filled in the first recess portion. An electrode layer is formed on the first surface, where a part of the electrode layer is formed on the display area, and the other part of the electrode layer is formed on the first vision opaque layer, and when an object touches or approaches the touch panel, the electrode layer correspondingly generates a touch signal. A metal material layer is formed on the first surface, where the metal material layer is located on the first vision opaque layer and is electrically connected to the electrode layer to transmit the touch signal.

According to the above descriptions, in the touch panel of the invention, by fabricating the first vision opaque layer, the circuit (for example, the metal material layer connected to the electrode layer) outside the display area of the touch panel is shielded to maintain a neat appearance. On the other hand, since the recess portion is formed at the area outside the display area of the touch panel to accommodate the vision opaque layer, a height difference between the electrode layer in the visual opaque area and the electrode layer in the display area can be effectively decreased. Therefore, a line break phenomenon of the electrode layer in the touch panel can be mitigated, so as to achieve good production yield.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

FIG. 1A to FIG. 1F are schematic diagrams of a manufacturing method of a touch panel according to a first embodiment of the invention. FIG. 1A to FIG. 1F are respectively cross-sectional views of the touch panel. FIG. 1G is a front view of the touch panel of FIG. 1F. First, a substrate 110 is provided, where the substrate 110 has a first surface S111 and a second surface S112 opposite to each other. In the present embodiment, the substrate 110 is, for example, a glass substrate, though the invention is not limited thereto. In other embodiment, the material of the substrate 110 can be other transparent material. Moreover, in the present embodiment, a maximum thickness of the substrate 110 is between 700 µm and 1000 µm. It should be noticed that the aforementioned parameter ranges are only used as an example, which are not used to limit the invention. The thickness of the substrate can be determined according to a design requirement of an actual product. Then, a first recess portion 113 is formed on the first surface S111 of the substrate 110, and a display area 111 is defined on the first surface S111. For example, in the present embodiment, a method of forming the first recess portion 113 is, for example, chemical etching. In another embodiment, the method of forming the first recess portion 113 also includes performing physical etching on a part of region (for example, a non-display area) of the first surface S111 of the substrate 110. For example, the physical etching includes milling, sand blasting or other mechanical etching, by which the first recess portion 113 is formed.

Figure 1A:
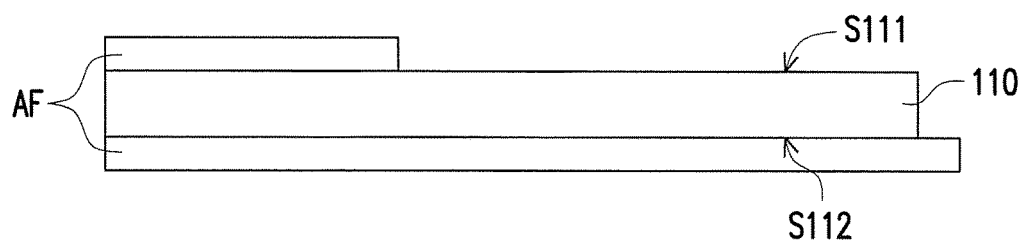
FIG. 1A to FIG. 1F are schematic diagrams of a manufacturing method of a touch panel according to a first embodiment of the invention.
Figure 1B:
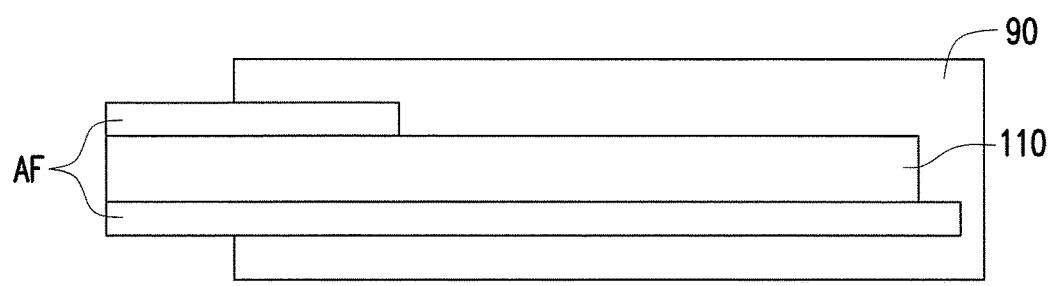
Figure 1C:
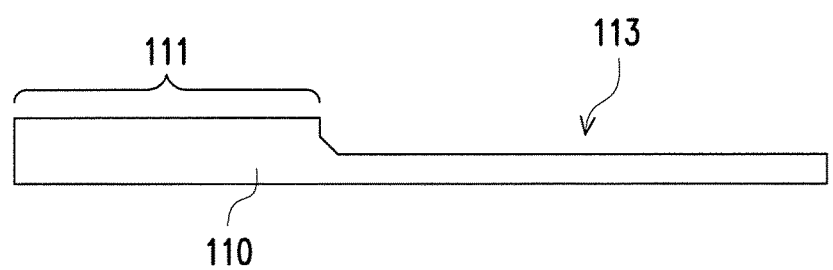

Further, FIG. 1A, FIG. 1B and FIG. 1C are schematic diagrams of a chemical etching process of the present embodiment. In the step of FIG. 1A, anti-etching films AF are, for example, covered on the first surface S111 and the second surface S112 of the substrate 110, and the anti-etching film AF is patterned to expose a part of the first surface S111. For example, the anti-etching film AF is patterned to expose the non-display area of the first surface S111. After the anti-etching film AF is covered, the chemical etching is performed on the first surface S111 of the substrate 110 that is covered with the anti-etching film AF, so as to form the first recess portion 113 in a part of region of the first surface S111. As that shown in FIG. 1B, the step of performing the chemical etching is, for example, to dip a part of or all of the substrate 110 covered with the anti-etching film AF into a solution 90 to remove a part of the substrate 110, so as to form the first recess portion 113. For example, in the present embodiment, the anti-etching film AF is an anti-hydrofluoric acid film, and the solution 90 is a hydrofluoric acid, though the invention is not limited thereto. In other embodiments, the method of performing the chemical etching also includes dipping the substrate 110 covered with the anti-etching film AF into other solutions, where a material of the anti-etching film AF is determined according to a characteristic of the solution 90, though the invention is not limited thereto. After the chemical etching is completed, the anti-etching film AF is removed, as that shown in FIG. 1C. Referring to the substrate 110 of FIG. 1C, the first recess portion 113 is formed at the non-display area outside the display area 111.

Figure 1D:
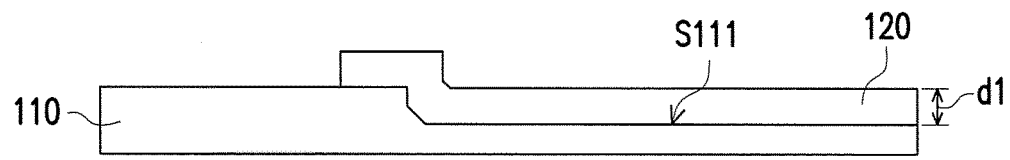
Figure 1E:
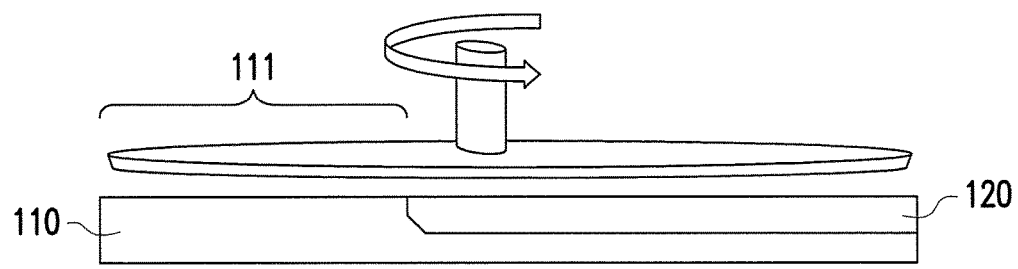

After the first recess portion 113 is formed, a first vision opaque layer 120 is formed on the first surface S111 of the substrate 110, where a part or all of the first vision opaque layer 120 is filled in the first recess portion 113. FIG. 1D and FIG. 1E are schematic diagrams of fabricating the first vision opaque layer 120 on the substrate 110 according to an embodiment of the invention. In the step of FIG. 1D, the first vision opaque layer 120 is formed on the first surface S11. For example, in the present embodiment, a part of or all of the first vision opaque layer 120 can be filled in the first recess portion 113 through screen printing, film attaching, coating, spray printing, or other methods. Moreover, a material of the first vision opaque layer 120 can be any light-blocking material, for example, black ink, white ink or other light color ink, etc. A thickness d1 of the first vision opaque layer 120 can be between 10 µm and 50 µm, though the invention is not limited thereto. It should be noticed that the aforementioned various parameter ranges and materials are only used as an example, which are not used to limit the invention. In other embodiments, the thickness d1 of the first vision opaque layer 120 can be determined according to a light transmittance of the vision opaque layer. After the first vision opaque layer 120 is formed, a planarization process (e.g., a grinding process) is performed on the first visual opaque layer 120, as that shown in FIG. 1E. The grinding process may eliminate or decrease a height difference between the display area 111 and the first vision opaque layer 120.

Figure 1F:
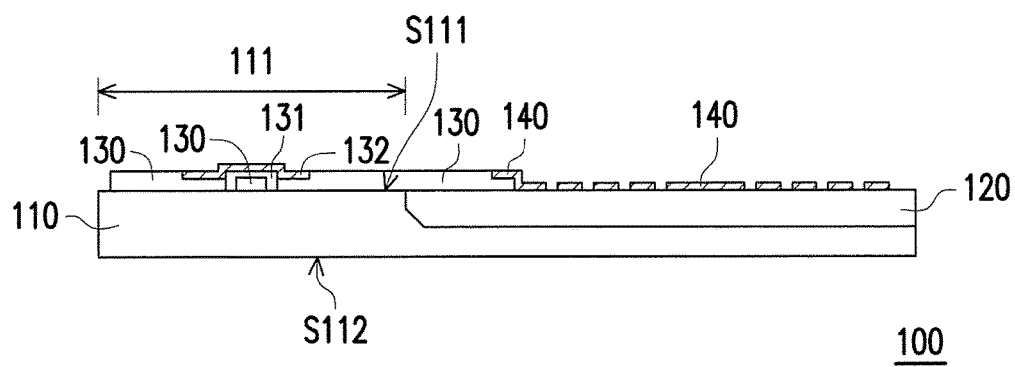
Figure 1G:
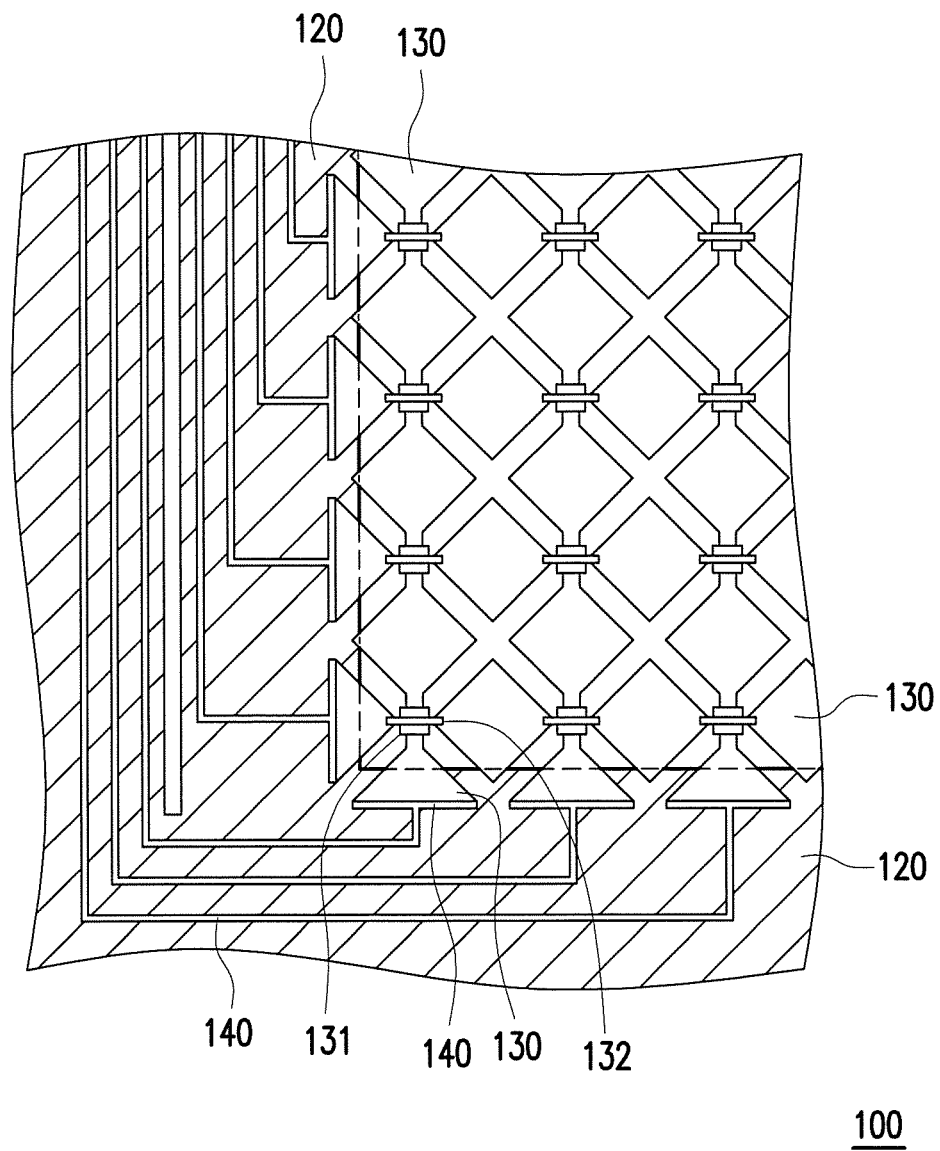
FIG. 1G is a front view of the touch panel of FIG. 1F.

After disposing the first vision opaque layer 120 on the first surface S111 of the substrate 110, an electrode layer 130 and a metal material layer 140 are sequentially formed on the first surface S111, as that shown in FIG. 1F. In the present embodiment, a material of the electrode layer 130 can be a transparent conductive material of a translucent conductive material, for example, indium-tin oxide (ITO), or other conductive materials. In detail, in the present embodiment, a part of the electrode layer 130 is formed on the display area 111, and the other part of the electrode layer 130 is formed on the first vision opaque layer 120. After disposing the electrode layer 130 on the first surface S111, the metal material layer 140 is formed on the first surface S111. In detail, in the present embodiment, the metal material layer 140 is formed on the first vision opaque layer 120, and is electrically connected to the electrode layer 130.

Further, in the present embodiment, by disposing a part of or all of the first vision opaque layer 120 in the first recess portion 113, the substrate 110 in the display area 111 and the first vision opaque layer 120 outside the display area 111 have a low height difference or none height difference there between, so as to avoid a line break phenomenon of the electrode layer 130 due to excessively large height difference during the process of fabricating the electrode layer 130 or the metal layer, so as to further enhance a production yield.

In this way, the touch panel 100 shown in FIG. 1F and FIG. 1G is formed. FIG. 1G is a front view of the touch panel 100 of FIG. 1F. The lateral sensing electrodes in the electrode layer 130 of FIG. 1G are electrically connected through metal connection lines 132, and an insulation layer 131 is formed between the metal connection lines 132 and the longitudinal sensing electrodes of the electrode layer 130. However, a layout structure of the electrode layer 130 located in the display area 111 can be any geometric structure, and implementation details thereof are not repeated. When an object touches or approaches the touch panel 100, the electrode layer 130 correspondingly generates a touch signal, and the metal material layer 140 may transmit the touch signal to a driving element (not shown).

Moreover, in the present embodiment, the touch panel 100 is, for example, set on a screen of a mobile phone, a tablet PC or other electronic apparatus, and the display area 111 of the touch panel 100 can serve as a touch sensing interface. By disposing the first vision opaque layer 120 on a part of or all of the non-display area outside the display area 111, the circuit (for example, the metal material layer 140 connected to the electrode layer 130) outside the display area 111 of the touch panel 100 is shielded to maintain a neat appearance (shown in FIG. 1G).

On the other hand, although one layer of the vision opaque layer 120 is taken as an example for descriptions in the aforementioned embodiment, the invention is not limited thereto. When the material of the first vision opaque layer 120 formed in the non-display area is the white ink, since a vision opaque effect of the white ink is not as good as that of the black ink, in order to enhance the vision opaque effect, the vision opaque layer can also be a multilayer coating. Further description is made below with reference of FIG. 2 to FIG. 3B.

Figure 2:
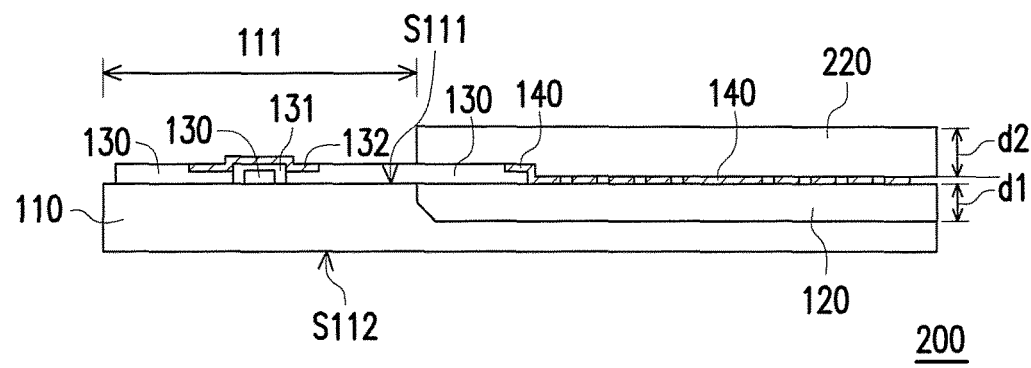
FIG. 2 is a cross-sectional view of a touch panel according to a second embodiment of the invention.

FIG. 2 is a cross-sectional view of the touch panel according to a second embodiment of the invention. A manufacturing method of the touch panel 200 shown in FIG. 2 is similar to that of the touch panel 100 of FIG. 1A to FIG. 1F, and a difference there between is as follows. Referring to FIG. 2, after the metal material layer 140 is formed, a second vision opaque layer 220 can be further formed on the first surface S111. In the present embodiment, the material of the first vision opaque layer 120 and/or the second vision opaque layer 220 is white ink or other light color ink. In detail, as that shown in FIG. 2, the second vision opaque layer 220 is stacked on the first vision opaque layer 120, and a part of the electrode layer 130 and the metal material layer 140 are clamped between the first vision opaque layer 120 and the second vision opaque layer 220. In detail, in the present embodiment, a total thickness of a thickness d1 of the first vision opaque layer 120 and a thickness d2 of the second vision opaque layer 220 are between 10 μm and 50 μm, though the invention is not limited thereto, and in other embodiments, the thickness d1 and d2 of the first vision opaque layer 120 and the second vision opaque layer 220 can be determined according to a material transmittance of the vision opaque layer.

In this way, the touch panel 200 shown in FIG. 2 is formed. In the present embodiment, since the touch panel 200 also has the technical feature that the electrode layer 130 in the display area 111 and outside the display area 111 has a low height difference or none height difference, the manufacturing method of the touch panel 200 also has the advantages as that described in the manufacturing method of the aforementioned touch panel 100, which are not repeated.

Figure 3A:
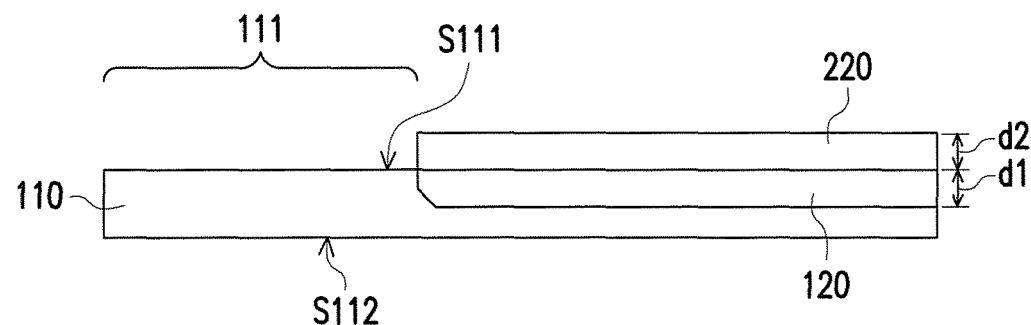
FIG. 3A to FIG. 3B are schematic diagrams of a manufacturing process of a second vision opaque layer according to a third embodiment of the invention.
Figure 3B:
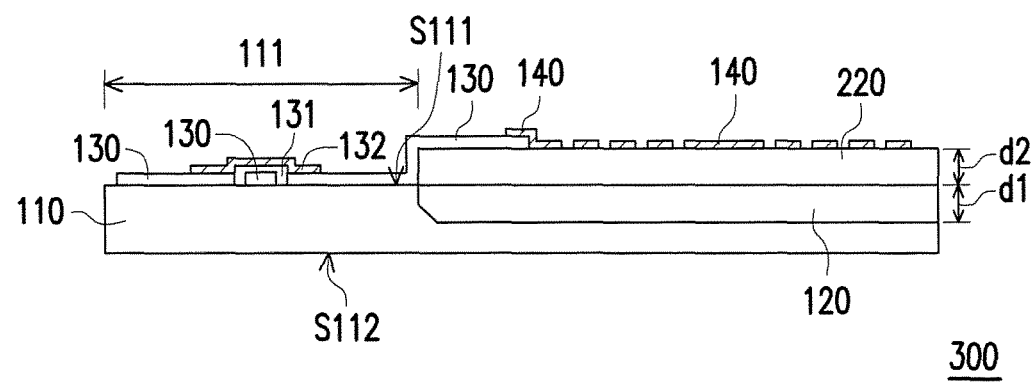

FIG. 3A to FIG. 3B are schematic diagrams of a manufacturing process of the second vision opaque layer according to a third embodiment of the invention. Related descriptions of the embodiment of FIG. 3A and FIG. 3B can be deduced with reference of related descriptions of FIG. 1A to FIG. 1G and FIG. 2. The manufacturing method of the touch panel 300 of the present embodiment is similar to the manufacturing method of the touch panel 200 of FIG. 2, and a difference there between is as follows. In the present embodiment, the step of forming the second vision opaque layer 220 is executed before the electrode layer 130 is formed. Namely, after the planarization process (for example, a grinding process) is performed on the first visual opaque layer 120, the second vision opaque layer 220 is formed on the first surface of the substrate 110, as that shown in FIG. 3A. After the second vision opaque layer 220 is formed, the electrode layer 130 and the metal material layer 140 are sequentially formed on the first surface of the substrate 110, such that the second vision opaque layer 220 is clamped between the first vision opaque layer 120 and the other part of the electrode layer 130 and clamped between the first vision opaque layer 120 and the metal material layer 140, as that shown in FIG. 3B. The fabrication process shown in FIG. 3B is similar to that of FIG. 1, and details thereof are not repeated. Moreover, in order to avoid excessive thickness d2 of the second vision opaque layer 220 to cause the line break phenomenon of the electrode layer 130, in the present embodiment, the thickness d2 of the second vision opaque layer 220 is 10 μm to 20 μm. It should be noticed that the aforementioned various parameter ranges are only used as an example, and are not used to limit the invention.

In this way, the touch panel 300 of FIG. 3B is fabricated. In the present embodiment, since the touch panel 300 also has the technical feature that the electrode layer 130 in the display area 111 and outside the display area 111 has a low height difference or none height difference, the manufacturing method of the touch panel 300 also has the advantages as that described in the manufacturing method of the aforementioned touch panel 100, which are not repeated.

On the other hand, an anti-light reflecting layer 450 is further configured between the electrode layer 130 and the substrate 110 in the display area 111 (shown in FIG. 4G), so as to mitigate a reflection phenomenon of the metal layer, which is further described below with reference of FIG. 4A to FIG. 4G.

FIG. 4A to FIG. 4G are schematic diagrams of a manufacturing method of a touch panel according to a fourth embodiment of the invention. FIG. 4A to FIG. 4G are respectively cross-sectional views of the touch panel. Related descriptions of the embodiment of FIG. 4A to FIG. 4G can be deduced with reference of related descriptions of FIG. 1A to FIG. 1G and FIG. 2. The manufacturing method of the touch panel 400 of the present embodiment is similar to the manufacturing method of the touch panel 100 of FIG. 1A to FIG. 1F, and a difference there between is as follows.

Figure 4A:
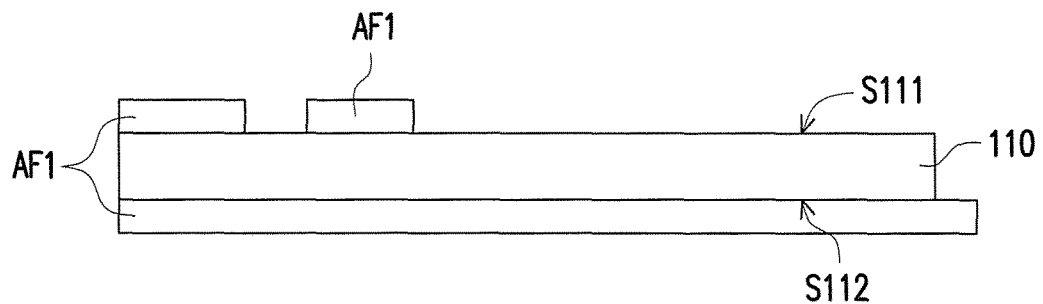
FIG. 4A to FIG. 4G are schematic diagrams of a manufacturing method of a touch panel according to a fourth embodiment of the invention.
Figure 4B:
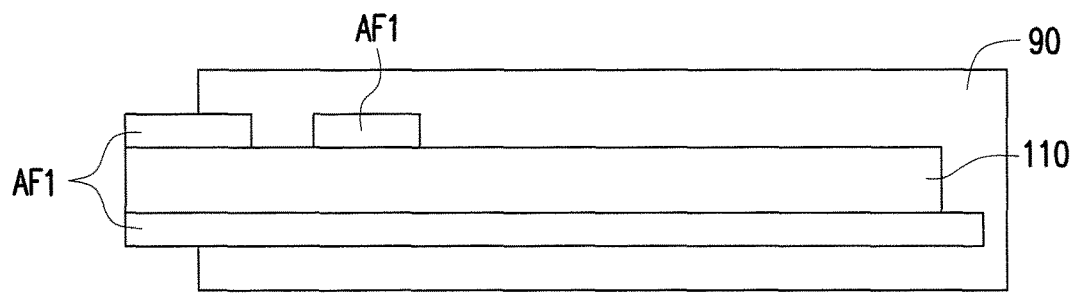
Figure 4C:
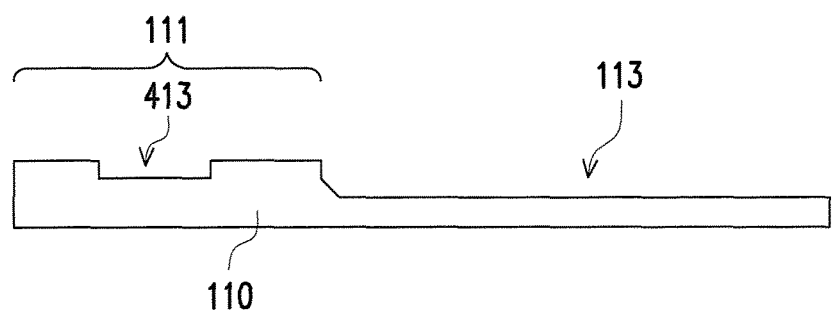

On the first surface S111 of the substrate 110, besides that the first recess portion 113 is formed in the non-display area of the substrate 110, a second recess portion 413 is further formed in the display area 111 of the substrate 110. In the present embodiment, a chemical etching process can be adopted to fabricate the first recess portion 113 and the second recess portion 413. FIG. 4A to FIG. 4C are schematic diagrams of the chemical etching process of the invention. In the step of FIG. 4A, a first anti-etching film AF1 is formed to cover the first surface and the second surface of the substrate 110, where the first anti-etching film AF1 is patterned to expose a part of the display area 111 of the substrate 110, and expose a part of or all of the non-display area.

After fabrication of the first anti-etching film AF1 is completed, the first surface of the substrate that is covered with the first anti-etching film AF1 is etched to form the second recess portion 413 at a part of area of the display area 111, and form the first recess portion 113 at a part of area of the non-display area. As that shown in FIG. 4B, the step of performing the chemical etching is, for example, to dip a part of or all of the substrate 110 covered with the first anti-etching film AF1 into the solution 90 to remove a part of the substrate 110, so as to form the first recess portion 113 and the second recess portion 413. After the etching process is completed, the first anti-etching film AF1 is removed (as that shown in FIG. 4C). Therefore, while the first recess portion 113 is formed at the non-display area outside the display area 111 of the substrate 110, at least one second recess portion 413 is formed in the display area 111 of the substrate 110.

In the present embodiment, a material of the first anti-etching film AF1 can be the same to that of the anti-etching film AF, and the method of covering the first anti-etching film AF1, the etching process and the method of removing the first anti-etching film AF1 are similar to the process steps described in the embodiment of FIG. 1A to FIG. 1C, and details thereof are not repeated.

Moreover, in other embodiments, a physical etching process or other etching process can be used to fabricate the first recess portion 113 and the second recess portion 413. For example, the physical etching process can be milling, sand blasting or other mechanical etching process, by which the first recess portion 113 and the second recess portion 413 are respectively formed.

Figure 4D:
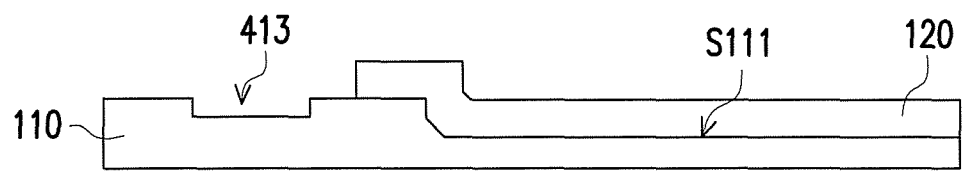
Figure 4E:
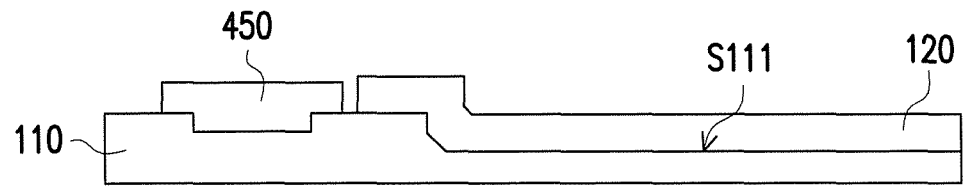
Figure 4F:
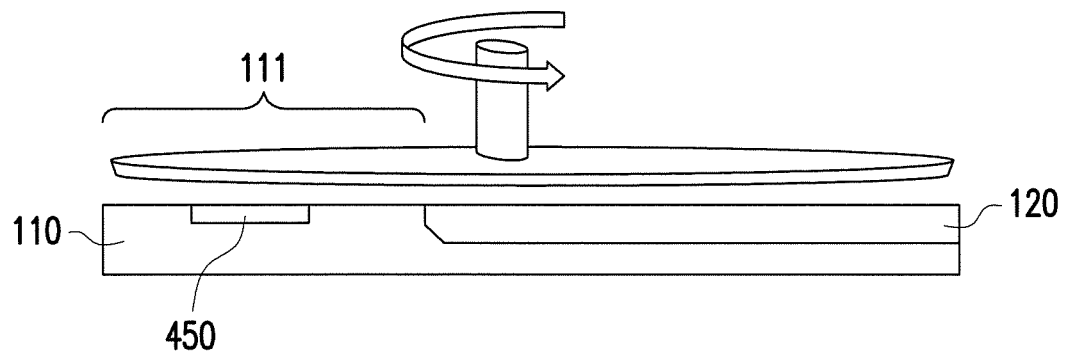

After the first recess portion 113 and the second recess portion 413 are formed, the first vision opaque layer 120 and the anti-light reflecting layer 450 are formed on the first surface of the substrate 110, where a part of or all of the first vision opaque layer 120 is filed in the first recess portion 113, and a part of or all of the anti-light reflecting layer 450 is filed in the second recess portion 413. FIG. 4D, FIG. 4E and FIG. 4F are schematic diagrams illustrating a process of fabricating the first vision opaque layer 120 and the anti-light reflecting layer 450 on the substrate 110 according to the embodiment of the invention. In the step shown in FIG. 4D, the first vision opaque layer 120 is formed on the first surface of the substrate 110. In the present embodiment, the method of fabricating the first vision opaque layer 120 is similar to the process step of FIG. 1D, and details thereof are not repeated.

After the first vision opaque layer 120 is formed, the anti-light reflecting layer 450 is filled in the second recess portion 413, as that shown in FIG. 4E. For example, in the present embodiment, the anti-light reflecting layer 450 is filled in the second recess portion 413 through screen printing, film attaching, coating, spray printing, or other methods. In the present embodiment, the anti-light reflecting layer 450 can be a refractive index matching layer, which can be used to mitigate an interface reflection phenomenon when the light passes through the electrode layer 130, the metal material layer 140 and the substrate 110.

Figure 4G:
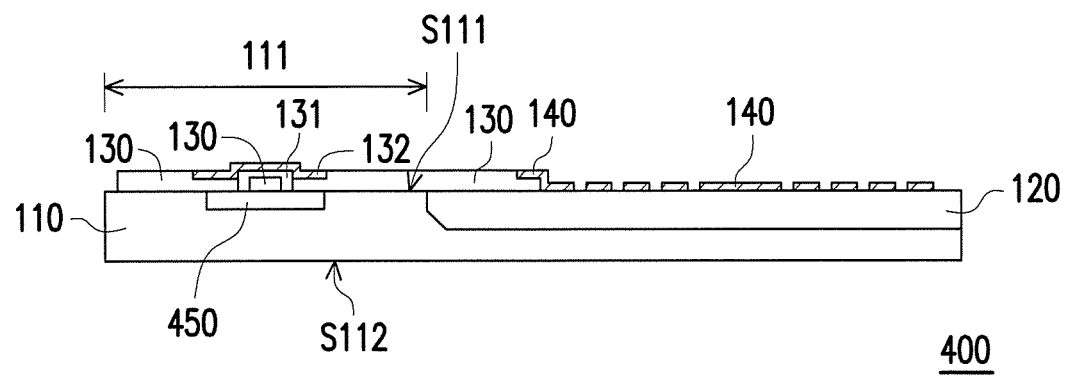

After the first vision opaque layer 120 and the anti-light reflecting layer 450 are formed, a planarization process (a grinding process) is performed on the first vision opaque layer 120 and the anti-light reflecting layer 450, as that shown in FIG. 4F. After the first vision opaque layer 120 and the anti-light reflecting layer 450 are formed on the first surface of the substrate 110, the electrode layer 130 and the metal material layer 140 are sequentially formed on the first surface of the substrate 110, as that shown in FIG. 4G. In the present embodiment, the process steps of FIG. 4F and FIG. 4G are similar to the process steps of FIG. 1E and FIG. 1F, and details thereof are not repeated. The metal connection lines 132 shown in FIG. 4G are stacked on the anti-light reflecting layer 450, and the anti-light reflecting layer 450 can mitigate/ameliorate the interface reflection phenomenon of the metal connection lines 132.

In this way, the touch panel 400 of FIG. 4G is fabricated. In the present embodiment, since the touch panel 400 also has the technical feature that the electrode layer 130 in the display area 111 and outside the display area 111 has a low height difference or none height difference, the manufacturing method of the touch panel 400 also has the advantages as that described in the manufacturing method of the aforementioned touch panel 100, which are not repeated. Moreover, in the present embodiment, by configuring the anti-light reflecting layer 450, the reflection phenomenon of the metal connection lines 132 is mitigated.

Moreover, it should be noticed that although the first recess portion 113 and the second recess portion 413 of the aforementioned embodiment are simultaneously formed to achieve a similar depth, the invention is not limited thereto, and in other embodiments, different process steps can be executed to form the first recess portion 113 and the second recess portion 413 of different depths h1 and h2, which is described below with reference of FIG. 5A to FIG. 5G.

Figure 5A:
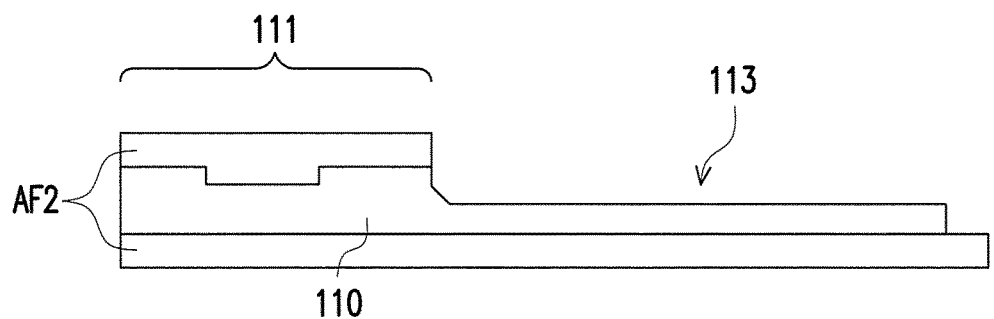
FIG. 5A to FIG. 5C are schematic diagrams of a manufacturing flow of a second recess portion of a touch panel according to a fifth embodiment of the invention.
Figure 5B:
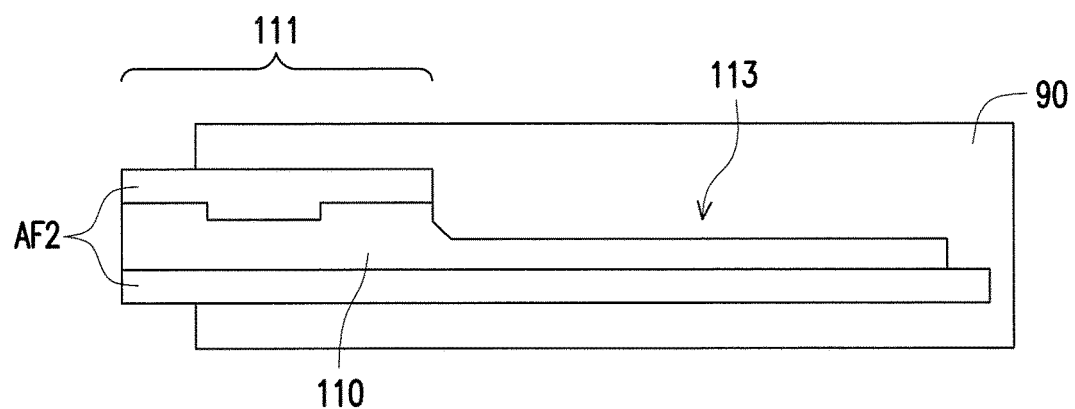
Figure 5C:
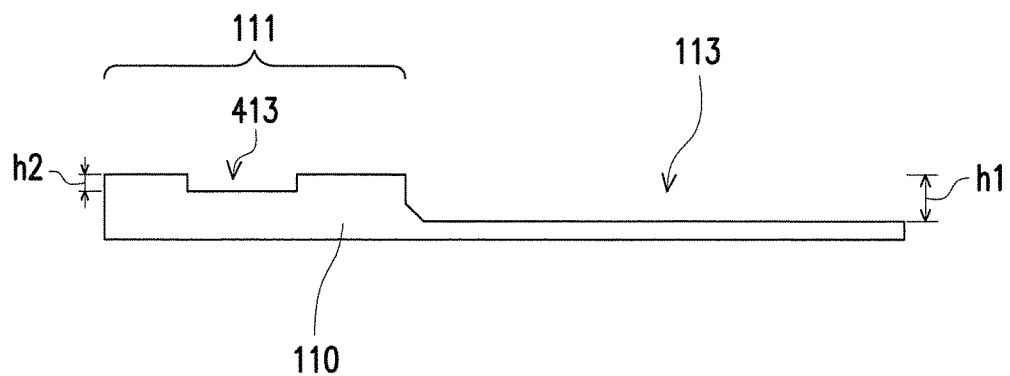
Figure 5D:
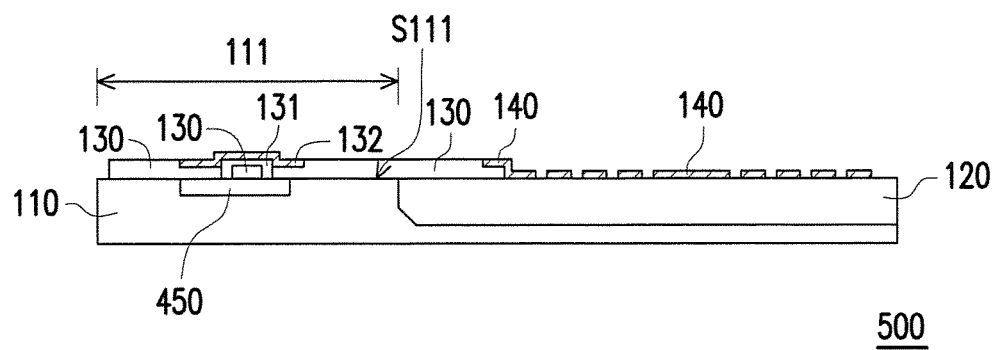
FIG. 5D is a cross-sectional view of the touch panel according to the fifth embodiment of the invention.

FIG. 5A to FIG. 5C are schematic diagrams of a manufacturing flow of the first recess portion 113 and the second recess portion 413 of a touch panel 500 according to a fifth embodiment of the invention. FIG. 5D is a cross-sectional view of the touch panel 500 according to the fifth embodiment of the invention. Descriptions of the embodiment of FIG. 5A to FIG. 5D can be deduced with reference of related descriptions of FIG. 1A to FIG. 1G, FIG. 2, FIG. 3A to FIG. 3B and FIG. 4A to FIG. 4G. The manufacturing method of the touch panel 500 of the present embodiment is similar to the manufacturing method of the touch panel 400 of FIG. 4A to FIG. 4G, and a difference there between is as follows. Referring to FIG. 5A to FIG. 5C, after the steps of FIG. 4A to FIG. 4C are performed to form the first recess portion 113 and the second recess portion 413, a second anti-etching film AF2 is formed to cover the surface of the substrate 110 having the first recess portion 113 and the second recess portion 413, where the second anti-etching film AF2 is patterned to expose a part of area (an area where the first recess portion is located) of the non-display area on the first surface of the substrate 110, as that shown in FIG. 5A.

After covering the second anti-etching film AF2 on the first surface of the substrate 110, the first surface of the substrate 110 that is covered with the second anti-etching film AF2 is etched (shown in FIG. 5B) to deepen the depth h1 of the first recess portion 113. Thereafter, as that shown in FIG. 5C, the second anti-etching film AF2 is removed. In the present embodiment, the material of the second anti-etching film AF2 can be the same with that of the first anti-etching film AF1, and the method of covering the second anti-etching film AF2 on the substrate 110, the etching process and the method of removing the second anti-etching film AF2 are similar to the process steps described in the embodiment of FIG. 1A to FIG. 1C, and details thereof are not repeated.

After the second anti-etching film AF2 is removed, the process steps of FIG. 4D to FIG. 4F are performed to sequentially form the first vision opaque layer 120 and the anti-light reflecting layer 450 in the first recess portion 113 and the second recess portion 413. Thereafter, the electrode layer 130 and the metal material layer 140 are sequentially formed on the first surface S111, as that shown in FIG. 5D. In the present embodiment, the process step of FIG. 5D is similar to the process step of FIG. 1F, and details thereof are not repeated.

In this way, the touch panel 500 of FIG. 5D is fabricated. In the present embodiment, since the touch panel 500 is also configured with the anti-light reflecting layer 450, and also has the technical feature that the electrode layer 130 in the display area 111 and outside the display area 111 has a low height difference or none height difference, the manufacturing method of the touch panel 500 also has the advantages as that described in the manufacturing method of the aforementioned touch panel 400, which are not repeated.

Figure 6A:
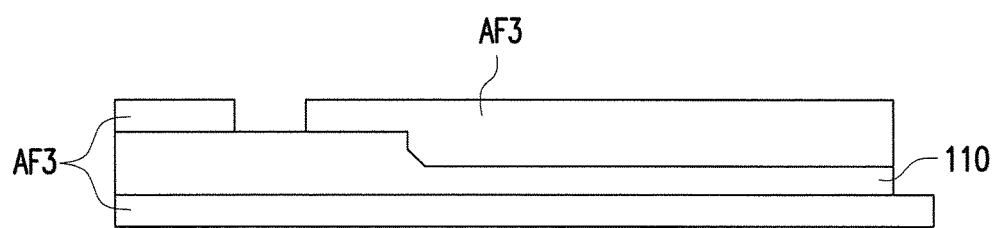
FIG. 6A to FIG. 6C are schematic diagrams of a manufacturing flow of a second recess portion of a touch panel according to a sixth embodiment of the invention.
Figure 6B:
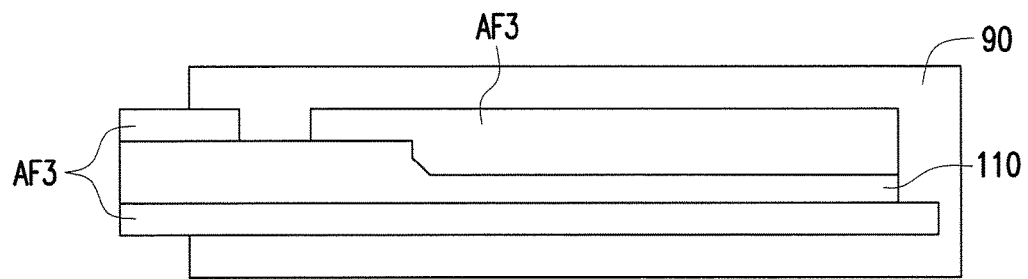
Figure 6C:
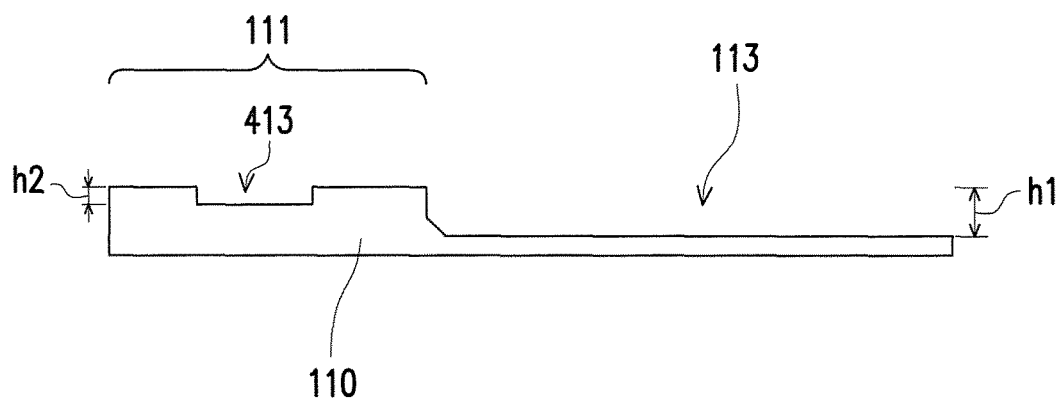
Figure 6D:
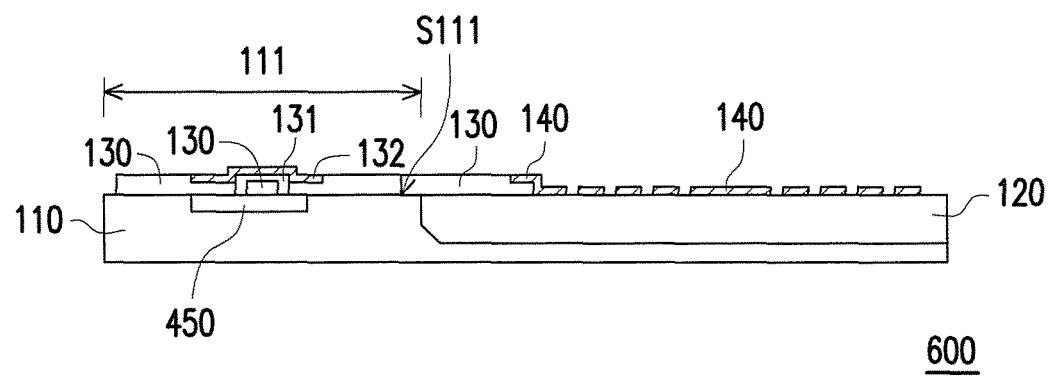
FIG. 6D is a cross-sectional view of the touch panel according to the sixth embodiment of the invention.

FIG. 6A to FIG. 6C are schematic diagrams of a manufacturing flow of the second recess portion of a touch panel 600 according to a sixth embodiment of the invention. FIG. 6D is a cross-sectional view of the touch panel 600 according to the sixth embodiment of the invention. Descriptions of the embodiment of FIG. 6A to FIG. 6D can be deduced with reference of related descriptions of FIG. 1A to FIG. 1G, FIG. 2, FIG. 3A to FIG. 3B and FIG. 4A to FIG. 4G. The manufacturing method of the touch panel 600 of the present embodiment is similar to the manufacturing method of the touch panel 400 of FIG. 4A to FIG. 4G, and a difference there between is as follows.

On the first surface of the substrate 110, besides that the first recess portion 113 is formed in the non-display area of the substrate 110, the second recess portion 413 is further formed in the display area 111 of the substrate 110 after the first recess portion 113 is formed. In the present embodiment, a chemical etching process can be used to fabricate the first recess portion 113 and the second recess portion 413. Related process of fabricating the first recess portion 113 may refer to related description of FIG. 1A to FIG. 1C, which are not repeated. After the steps of FIG. 1A to FIG. 1C are performed to fabricate the first recess portion 113, a second anti-etching film AF3 is formed to cover the surface of the substrate 110, where the second anti-etching film AF3 is patterned to expose a part of area of the display area 111 on the first surface S111, as that shown in FIG. 6A.

After the second anti-etching film AF3 is formed on the substrate 110, the first surface S111 of the substrate 110 covered with the second anti-etching film AF3 is etched to form the second recess portion 413 at a part of area of the display area 111. As that shown in FIG. 6B, the step of performing the chemical etching is, for example, to dip a part of or all of the substrate 110 covered with the anti-etching film AF3 into the solution 90 to remove a part of the substrate 110, so as to form the second recess portion 413. After etching of the second recess portion 413 is completed, the second anti-etching film AF3 is removed (shown in FIG. 6C). In the present embodiment, the material of the second anti-etching film AF3 can be the same with that of the anti-etching film AF of FIG. 1A to FIG. 1C, and the method of covering the second anti-etching film AF3, the etching process and the method of removing the second anti-etching film AF3 are similar to the process steps described in the embodiment of FIG. 1A to FIG. 1C, and details thereof are not repeated.

In the present embodiment, the first recess portion 113 and the second recess portion 413 are formed through different process steps, and when the process step of fabricating the second recess portion 413 is performed, the first recess portion 113 is covered by the second anti-etching film AF3, such that the depth h1 of the first recess portion 113 is not influenced. In this way, those skilled in the art can determine the depths h1 and h2 of the first recess portion 113 and the second recess portion 413 according to an actual requirement.

After the second anti-etching film AF3 is removed, the process steps of FIG. 4D to FIG. 4F are performed to sequentially form the first vision opaque layer 120 and the anti-light reflecting layer 450 in the first recess portion 113 and the second recess portion 413. Thereafter, the electrode layer 130 and the metal material layer are sequentially formed on the first surface S111, as that shown in FIG. 6D. In the present embodiment, the process step of FIG. 6 is similar to the process step of FIG. 1F, and detailed descriptions thereof are not repeated.

In this way, the touch panel 600 of FIG. 6D is fabricated. In the present embodiment, since the touch panel 600 is also configured with the anti-light reflecting layer 450, and also has the technical feature that the electrode layer 130 in the display area 111 and outside the display area 111 has a low height difference or none height difference, the manufacturing method of the touch panel 600 also has the advantages as that described in the manufacturing method of the aforementioned touch panel 400, which are not repeated.

Moreover, in other embodiments, the touch panel 400 of FIG. 4G, the touch panel 500 of FIG. 5D and the touch panel 600 of FIG. 6D can be selectively configured with the second vision opaque layer 220. Details of configuring the second vision opaque layer 220 may refer to related descriptions of FIG. 2 or FIG. 3A to FIG. 3B, which are not repeated.

In summary, in the touch panel of the invention, by fabricating the first vision opaque layer, the circuit (for example, the metal material layer connected to the electrode layer) outside the display area of the touch panel is shielded to maintain a neat appearance. On the other hand, since the touch panel has a technical feature that the electrode layer in the display area and outside the display area has a low height difference or none height difference, a line break phenomenon of the electrode layer is mitigated, so as to achieve good production yield. Moreover, the touch panel can be further configured with an anti-light reflecting layer to mitigate the reflection phenomenon of the metal connection lines.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel, configured to provide a touch signal, the touch panel comprising:
    a substrate, having a display area and a first recess portion outside the display area;
    a first vision opaque layer, formed on the substrate, wherein a part of or all of the first vision opaque layer is filled in the first recess portion;
    a second vision opaque layer, stacked on the first vision opaque layer;
    an electrode layer, a first part of the electrode layer being formed on the display area and a second part of the electrode layer being formed on the first vision opaque layer, wherein when an object touches or approaches the touch panel, the electrode layer correspondingly generates the touch signal; and
    a metal material layer, formed on the first vision opaque layer, and electrically connected to the electrode layer to transmit the touch signal to a driving element.

2. The touch panel as claimed in claim 1, wherein the second part of the electrode layer and the metal material layer are clamped between the first vision opaque layer and the second vision opaque layer.

3. The touch panel as claimed in claim 1, wherein the second vision opaque layer is clamped between the first vision opaque layer and the second part of the electrode layer, and is clamped between the first vision opaque layer and the metal material layer.

4. The touch panel as claimed in claim 1, wherein a total thickness of the first vision opaque layer and the second vision opaque layer is between 10 μm and 50 μm.

5. The touch panel as claimed in claim 1, wherein a material of the first and the second vision opaque layers is white ink.

6. The touch panel as claimed in claim 1, wherein the substrate further comprises at least a second recess portion located in the display area, and the touch panel further comprises:
an anti-light reflecting layer, formed on the substrate, wherein the anti-light reflecting layer is filled in the second recess portion, and is located between the substrate and the electrode layer.

7. A manufacturing method of a touch panel, comprising:
providing a substrate, wherein the substrate has a first surface and a second surface opposite to each other;
forming a first recess portion on the first surface of the substrate, and defining a display area on the first surface, wherein the first recess portion is located outside the display area;
forming a first vision opaque layer on the first surface, wherein a part of or all of the first vision opaque layer is filled in the first recess portion;
forming a second vision opaque layer on the first surface, wherein the second vision opaque layer is stacked on the first vision opaque layer;
forming an electrode layer on the first surface, wherein a first part of the electrode layer is located on the display area, and a second part of the electrode layer is located on the first vision opaque layer, and when an object touches or approaches the touch panel, the electrode layer correspondingly generates a touch signal; and
forming a metal material layer on the first surface, wherein the metal material layer is located on the first vision opaque layer and is electrically connected to the electrode layer to transmit the touch signal.

8. The manufacturing method of the touch panel as claimed in claim 7, wherein a method of forming the first recess portion comprises:
covering an anti-etching film on the first surface, wherein the anti-etching film is patterned to expose a part of area of the first surface;
etching the first surface of the substrate that is covered with the anti-etching film, so as to form the first recess portion at the part of area of the first surface; and
removing the anti-etching film.

9. The manufacturing method of the touch panel as claimed in claim 7, wherein a method of forming the first recess portion comprises:
performing physical etching on a part of area of the first surface of the substrate to form the first recess portion.

10. The manufacturing method of the touch panel as claimed in claim 7, further comprising:
forming at least one second recess portion on the display area of the substrate; and
filing an anti-light reflecting layer in the second recess portion.

11. The manufacturing method of the touch panel as claimed in claim 10, wherein a method of forming the second recess portion comprises:
performing physical etching on a part of the first surface located in the display area of the substrate to form the second recess portion.

12. The manufacturing method of the touch panel as claimed in claim 10, wherein a method of forming the second recess portion comprises:
covering a first anti-etching film on the first surface, wherein the first anti-etching film is patterned to expose the part of area of the display area of the substrate;
etching the first surface of the substrate that is covered with the first anti-etching film, so as to form the second recess portion at the part of area of the display area; and
removing the first anti-etching film.

13. The manufacturing method of the touch panel as claimed in claim 10, wherein the first anti-etching film is patterned to expose a part of area of a non-display area of the first surface, and the part of area of the non-display area is etched to form the first recess portion.

14. The manufacturing method of the touch panel as claimed in claim 13, further comprising:
covering a second anti-etching film on the first surface having the first recess portion, wherein the second anti-etching film is patterned to expose the part of area of the non-display area of the first surface;
etching the first surface of the substrate that is covered with the second anti-etching film, so as to deepen a depth of the first recess portion; and
removing the second anti-etching film.

15. The manufacturing method of the touch panel as claimed in claim 10, wherein the step of filling the anti-light reflecting layer in the second recess portion comprises:
filling the anti-light reflecting layer in the second recess portion through screen printing or film attaching.

16. The manufacturing method of the touch panel as claimed in claim 7, wherein a method of forming the first recess portion comprises:
covering a first anti-etching film on the first surface, wherein the first anti-etching film is patterned to expose a part of area of a non-display area of the first surface;
etching the first surface of the substrate that is covered with the first anti-etching film, so as to form the first recess portion at the part of area of the non-display area;
removing the first anti-etching film;
covering a second anti-etching film on the first surface, wherein the second anti-etching film is patterned to expose a part of area of the display area of the first surface;
etching the first surface of the substrate that is covered with the second anti-etching film, so as to form a second recess portion at the part of area of the display area;
removing the second anti-etching film; and
filling an anti-light reflecting layer in the second recess portion.

17. The manufacturing method of the touch panel as claimed in claim 7, wherein the step of forming the second vision opaque layer is executed before the step of forming the electrode layer, such that the second vision opaque layer is clamped between the first vision opaque layer and the second part of the electrode layer, and is clamped between the first vision opaque layer and the metal material layer.

18. The manufacturing method of the touch panel as claimed in claim 7, wherein the step of forming the second vision opaque layer is executed after the step of forming the metal material layer, such that the metal material layer is clamped between the first vision opaque layer and the second vision opaque layer.

19. The manufacturing method of the touch panel as claimed in claim 7, further comprising:
   grinding the first vision opaque layer before the step of forming the electrode layer.

20. The manufacturing method of the touch panel as claimed in claim 7, wherein the step of forming the first vision opaque layer on the first surface comprises:
   filling a part of or all of the first vision opaque layer in the first recess portion through screen printing or film attaching.

\* \* \* \* \*